Feb. 2, 1954 E. L. PURKEY 2,667,939
CONTROL FOR VEHICLES
Filed Oct. 8, 1951 3 Sheets-Sheet 1
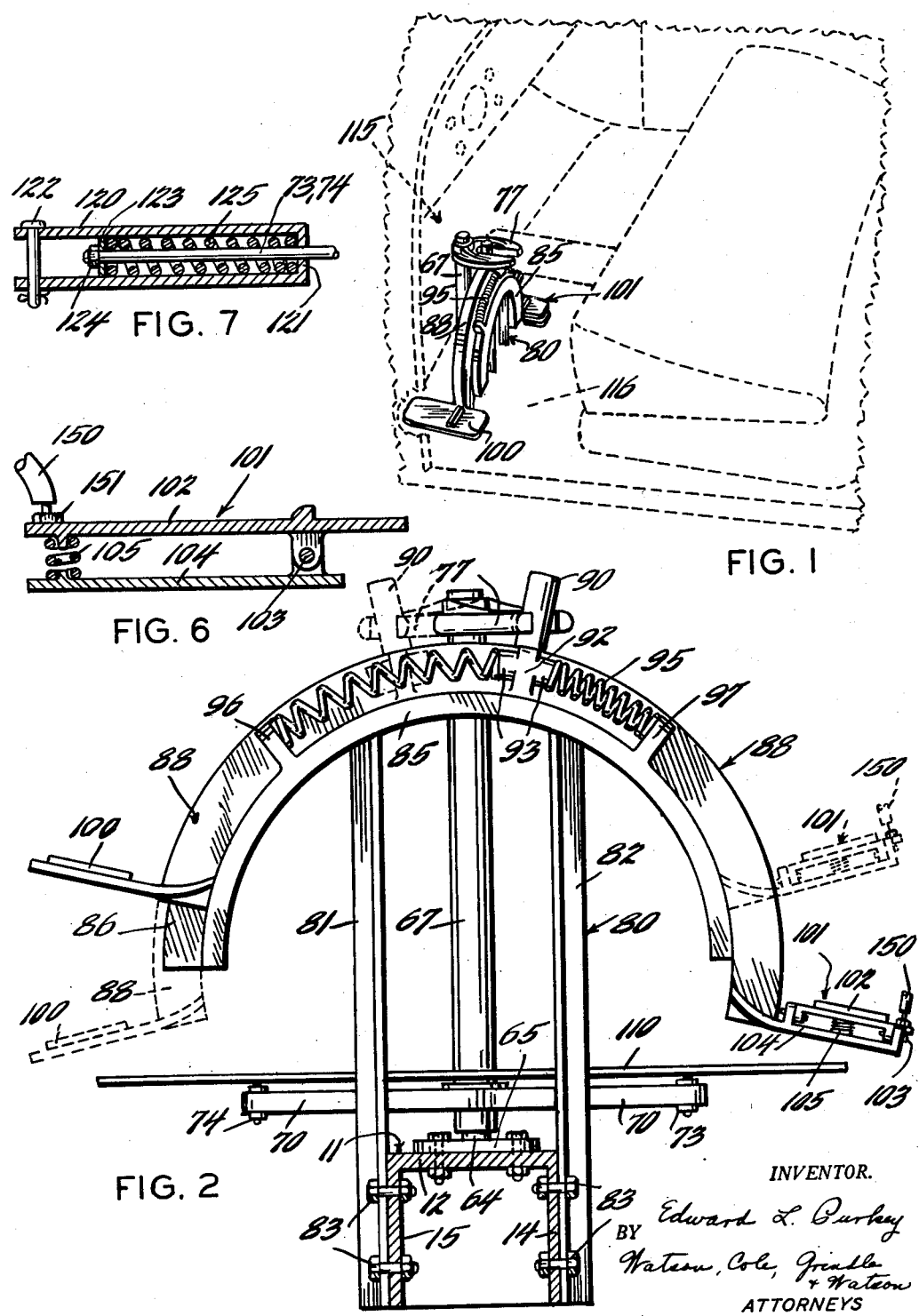
INVENTOR.
Edward L. Purkey
BY Watson, Cole, Grindle & Watson
ATTORNEYS

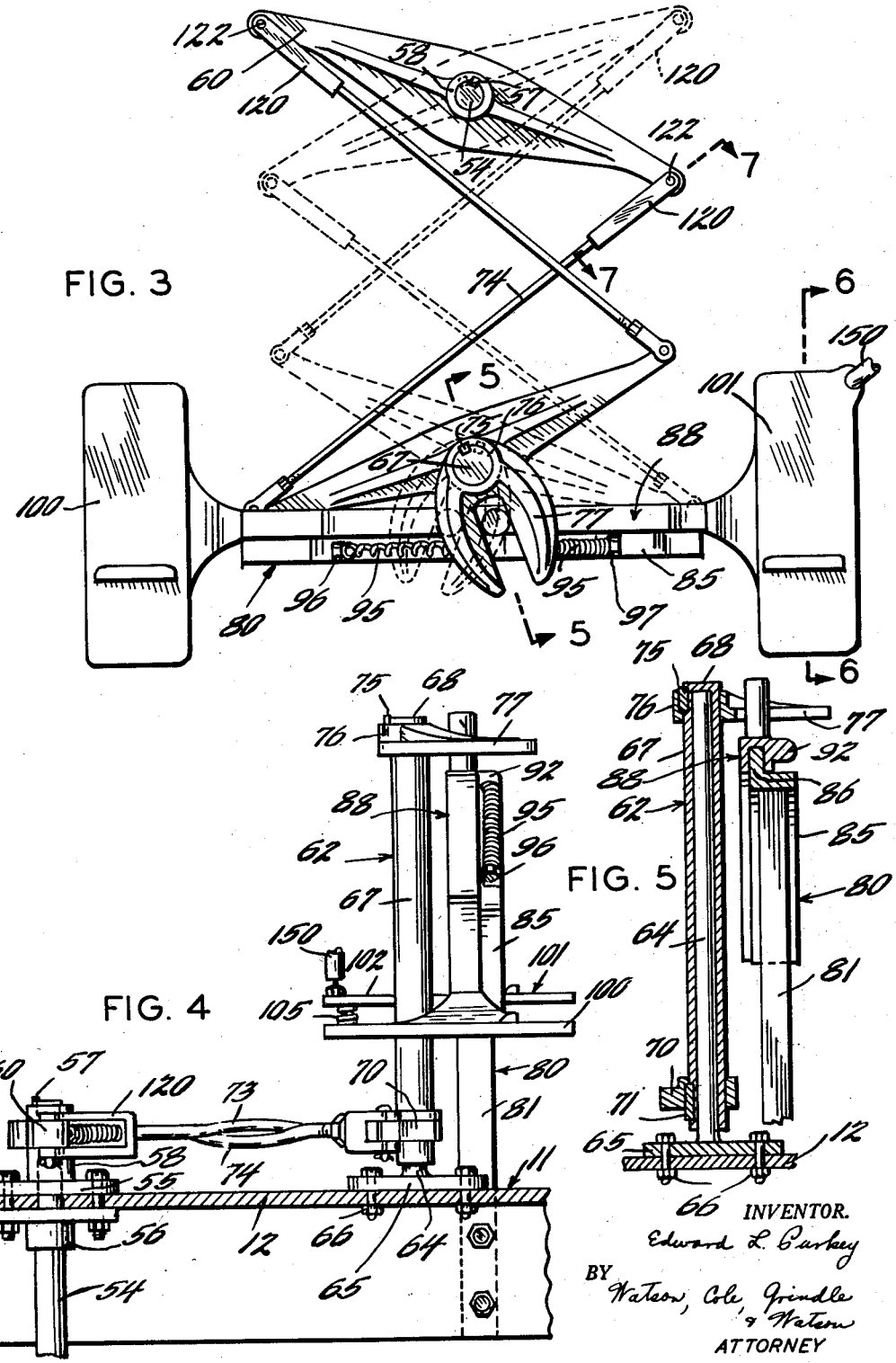

Feb. 2, 1954     E. L. PURKEY     2,667,939
CONTROL FOR VEHICLES

Filed Oct. 8, 1951     3 Sheets-Sheet 3

INVENTOR
Edward L. Purkey
BY Watson, Cole, Grindle & Watson
ATTORNEYS

Patented Feb. 2, 1954

2,667,939

UNITED STATES PATENT OFFICE 2,667,939

CONTROL FOR VEHICLES

Edward Lincoln Purkey, Oklahoma City, Okla.

Application October 8, 1951, Serial No. 250,711

8 Claims. (Cl. 180—78)

This invention relates to means of transportation and more particularly to controlling devices for vehicles or craft, for example, the steering and speed-controlling mechanism for motor vehicles of various types.

The general object of the invention is to provide a novel and improved pedal actuated steering or controlling means which is adaptable for use in vehicles of various types.

A more specific object is to provide a pedal steering device of this character which embodies means for controlling the motor of the vehicle when the device is installed in a power-driven vehicle.

In its preferred embodiment the invention is applied to bicycle, tricycle, or four-wheeled land vehicles and contemplates the provision of an arcuate or segmental member having foot rests or treadles at each end thereof and mounted upon a similarly shaped guide track for oscillatory or rocking movement in a substantially vertical plane and transversely of the vehicle. The arcuate member is operatively connected to the dirigible wheel or wheels of the vehicle by means of rocking levers and connecting linkages of novel construction and assembly, and these connections may include, if desired, resilient cushioning means whereby any shocks incident to the steering operation may be absorbed.

Other objects and features of novelty will be apparent from the following specification when read in connection with the accompanying drawings in which certain embodiments of the invention are illustrated by way of example.

In the drawings:

Figure 1 is a view in perspective of the application of the novel steering pedals to a four-wheeled automotive vehicle, the basic relative portions of the vehicle being shown fragmentarily and in broken lines;

Figure 2 is a view in transverse section of the novel steering device, certain remote portions of the installation being omitted for the sake of clearness of illustration;

Figure 3 is a plan view of the steering installation;

Figure 4 is a view in longitudinal section of the same;

Figure 5 is a vertical sectional view taken on line 5—5 of Figure 3;

Figure 6 is a detail sectional view of the pedal portion of the device, taken on line 6—6 of Figure 3;

Figure 7 is a sectional view taken on line 7—7 of Figure 3; and

Figure 8:
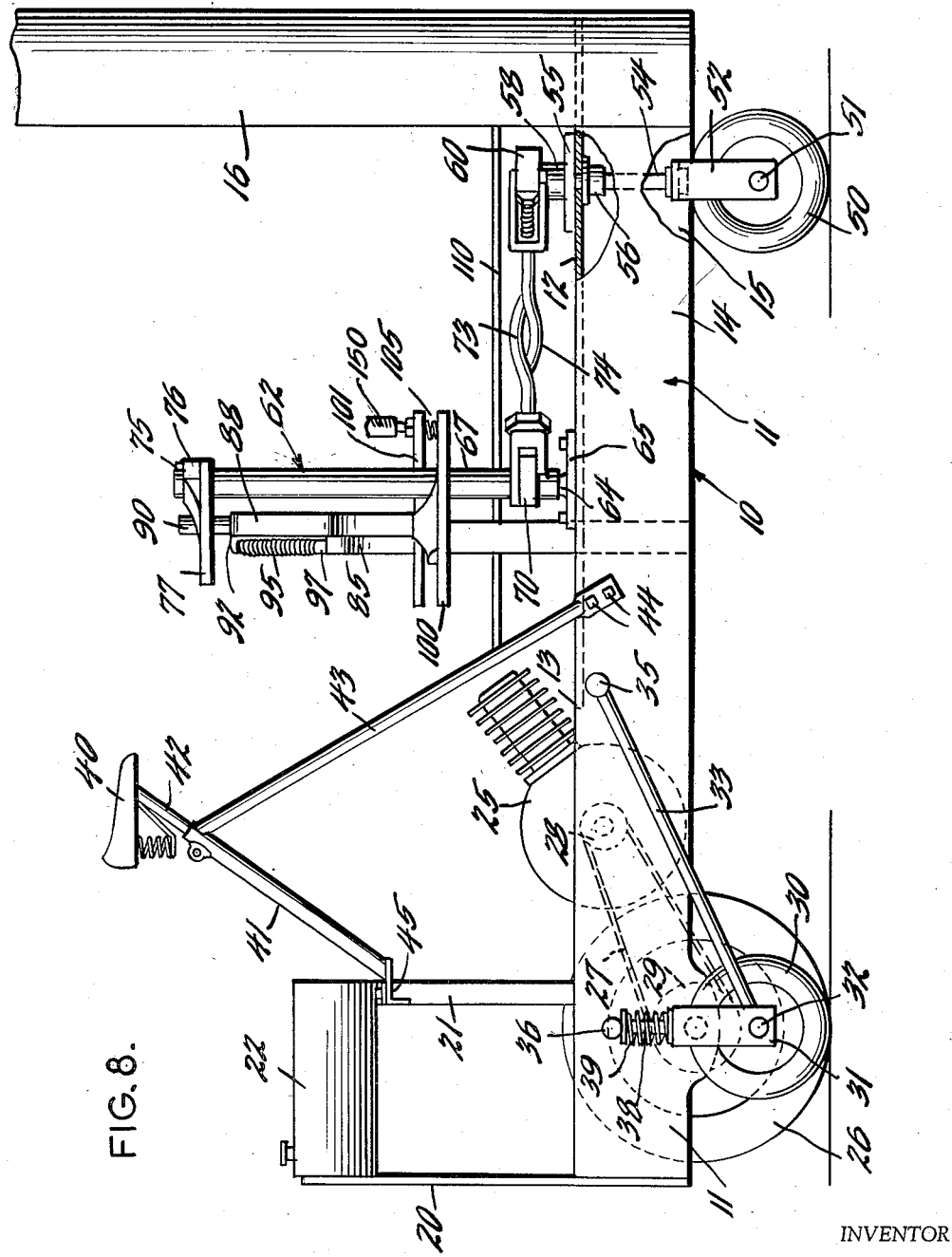
Figure 8 is a view in side elevation, and in somewhat diagrammatic form, of a "motor-bike" in which the principles of the invention are embodied.

The novel steering device which forms the subject matter of the present invention has a wide variety of applications to all sorts of steerable vehicles and craft, but it is illustrated and described herein as applied to two different types of road vehicle. In Figure 8, the embodiment comprises a type of motor-bike, while in Figure 1 the device is shown as applied to an automobile of a general type.

In Figure 8 of the drawings the vehicle is indicated generally by the reference numeral 10 and is shown rather diagrammatically with portions of the sheathing or covering removed and other parts broken away for the sake of clearness of illustration. The principal supporting frame of the vehicle comprises a longitudinally extending member 11 which, for the greater part of its length, is preferably of inverted channel section having a horizontal web plate 12 which extends rearwardly at least to the point 13, and the two side flanges indicated at 14 and 15.

At the front end of the frame there may be provided a windshield 16, at least the upper portion of which is made of some transparent but durable material.

At the rear end of the frame 11 there is fixed a rear wall 20 and at a point spaced slightly forwardly of the rear end of the frame there is disposed an upwardly extending post or framework 21 which may conveniently be made of angle irons.

The vehicle 10 is preferably motorized and a fuel tank 22 is supported by the rear wall 20 and the vertical framework 21. A single-cylinder engine 25 is carried at an intermediate point of the frame 11 and is operatively connected with the centrally disposed drive wheel 26 by means of the belt or chain 27 which extends between the drive pulley 28 of the engine and the pulley 29 carried by the wheel.

If desired, a pair of outrigger wheels 30 may be provided, one upon either side of the drive wheel 26. Inverted U-shaped brackets 31 are supported by the stub axles 32 of the wheels 30 and these U-shaped frames 31 are connected for vertical swinging movement with relation to the frame 10 by means of the drag frames consisting of the rearwardly extending bars 33, the forward ends of which are connected to the transverse rock shaft 35.

A fixed transverse shaft 36 is carried by the rear portion of the frame 11 and extends to points above each of the lateral wheel-supported frames 31. A vertical pin 38 extends downwardly through an opening in the upper web of each frame 31 for guiding the vertical movements of the frames, and this movement is cushioned by means of the coil springs 39 which are seated between spring stops carried by the rod or bar 36 and the upper portion of the wheel frame 31 respectively. An operator's seat 40 is carried by a framework consisting of the hollow post 41 which adjustably receives the shank 42 of the seat and the inclined struts 43 which are fixed as at 44 to the frame 11. The lower rearward end of the post 41 is secured to a transverse angle element 45 at the top of the transverse framework 21.

The principal points of novelty of the present invention are involved in the steering mechanism which will now be described, with particular reference to Figures 8, 2, 3, 4 and 5. The forward portion of the vehicle 10 is supported upon the steerable ground wheel 50. This wheel is provided with the axle 51 which supports the yoke 52 which straddles the ground wheel. Rigidly secured to the yoke and extending upwardly therefrom is the wheel post or standard 54 which is rotatably mounted in the bearing plates shown at 55 carried by the web 12 of the frame 11. A collar 56 fixed to the post 54 prevents upward movement of the post through the supporting frame. Keyed as at 57 to the upper end of the post 54 is the hub 58 of the cross-arm 60.

A steering post assembly 62 is disposed upon the frame 11 at a point spaced rearwardly from the position of the wheel post 54. This assembly comprises the vertical rod or standard 64 which is rigid with a base plate 65 bolted as at 66 to the web 12 of the frame. A tubular steering post element 67, having a closed end 68, surrounds the rod 64 and is rotatably mounted thereon. A cross-arm 70 is keyed to the lower portion of the member 67 as at 71. The diagonally opposite ends of the cross-arms 60 and 70 are connected respectively by the rods or links 73 and 74.

Keyed as at 75 to the upper end of the rotatable steering post member 67 is the hub portion 76 of the bifurcated lever, crank, or yoke 77, which extends in a general rearwardly direction.

Immediately adjacent the steering post assembly 62 and rearwardly thereof, there is disposed a framework 80 consisting of the upright angle posts 81 and 82 which are bolted as at 83 to the respective side flanges 14 and 15 of the supporting frame 11, and extend upwardly therefrom to support the arcuate guide member 85. This guide member extends through a circular arc of approximately 180° and is upwardly bowed at its center and provided with an outwardly directed flange 86. Upon this flange is fitted a rigid arcuate steering member indicated generally by the reference numeral 88. This steering member 88 is of a substantially U-shaped cross-section and dimensioned so as to fit upon the flange 86 of the frame 80 for sliding arcuate movement in the plane of the framework. Centrally of the member 88 there is provided a projecting pin 90 which is received between the bifurcations of the yoke or lever 77. Projecting rearwardly from the central portion of the sliding control member 88 is the spring seat element 92, this element being provided with opposite projections 93 against which the ends of the coil springs 95 abut. The opposite ends of these springs are seated against the projections 96 and 97 formed on the frame element 85. The springs 95 are of the same strength and it will be readily seen that by means of the installation described, the steering member 88 is continually and resiliently urged toward its central position whereby the steered wheel 50 is set normally for straight-ahead travel.

Upon one end of the arcuate steering member 88 there is fixed a footrest or pedal 100, while upon the opposite end the footrest arrangement is modified to provide a treadle indicated generally by the reference numeral 101. This treadle installation comprises a foot lever 102 pivoted at 103 to the basic footrest portion 104 which projects from the end of the member 88. The treadle element 102 is urged upwardly by means of the coil spring 105. The purpose and function of this treadle arrangement will be described presently.

The entire lower portion of the steering mechanism including the linkages which connect the device with the wheel post may be disposed beneath the flooring 110 if such flooring is provided in the vehicle. This provision is particularly desirable when the device is applied to a conventional motor vehicle as shown in Figure 1 of the drawings, the vehicle being indicated generally by the reference numeral 115 and the floor-boards of the forward portion of the body of the vehicle being indicated at 116. The device shown in this figure is given the same reference numerals as in the other figures of the drawing and the adaptation of the steering arrangement here disclosed will be readily understood.

The operation of the steering device will now be described, together with certain minor features of construction which serve to facilitate the control. The operator places his feet upon the footrest portions 100 and 101 at the ends of the arcuately movable steering member 88 and he may support his entire weight upon the seat 40 of the motor bike or the usual driver's seat of the automobile, or in the former case he may merely use the seat and bracing structure 40—43 as a leaning support, treating the motor bike 10 more or less as a motorized skate. In this case the seat element 40 would be extended to a higher point than that shown in Figure 8.

By suitably applying pressure to one or the other of the footrest members 100 and 101 the steering member 88 may be swung against the compression of one of the springs 95 to rotate the steering post sleeve member 67 in one direction or the other. The cross-arm 70 is thus swung in its horizontal plane and a corresponding but opposite rotation is given the cross-arm 60 which is fixed to the wheel post 54, due to the crossing of the connecting links 73 and 74. This assures that the wheel post 54 and the guide wheel 50 will be swung toward the same side of the vehicle as the depressed pedal of the steering member 88. In Figures 2 and 3 the parts are shown in solid lines in the positions which they occupy when the right-hand pedal 101 is depressed and the wheel 50 steered to the right. In dotted lines there are shown the positions of the principal parts when the left-hand pedal 100 is depressed and the wheel swung to the left.

In order to cushion any shocks sustained by the steering wheel during its travel over the road or any inadvertent shocks applied to the mechanism by the operator, the connections between the forward ends of the linkages 73 and 74 are provided with resilient features. One example of this arrangement is shown particularly in Figures 8, 3, 4 and 7 of the drawings. The connections of the forward ends of the rods 73 and 74 are effected by means of the clevises 120, the bight portions 121 of which are provided with openings through which the rods 73, 74 may pass. The clevises are pivotally secured to the respective ends of the cross-arm 60 by means of the pins or bolts 122. A spring stop plate 123 is retained upon the end of each of the rods 73, 74 by means of the bolt 124. A coil spring 125 is compressed between the element 123 and the bight portion 121 of the clevis. Thus the pull of the rods 73, 74 upon the ends of the steering cross-arm 60 is resiliently cushioned.

It is obvious that the steering mechanism described above is readily applicable to road vehicles of any description whether propelled by manual means under the control of the operator or by power driven means. In the examples illustrated, the vehicles are motor driven and means are provided for simultaneously steering the device with the feet and also controlling the engine or transmission in the same way. Merely as an example of this feature, there is shown in most of the figures of drawing a connection 150 having a portion fixed as at 151 to one end of the treadle element 102. This connection may be a Bowden wire control which may be attached to the throttle valve of the engine, a gear shifting element, or to any other controlling device which may be adapted to start, stop, or regulate the speed of the vehicle, whether the source of power is a gasoline engine, an electric motor, or any other known or suitable device.

It will be readily understood how the steering is effected by alternately applying even pressure of the foot on the respective footrests at the ends of the steering member 88, and the engine or transmission controlled by rocking the right foot on the treadle arrangement 101 in a fore and aft plane.

It is understood that various changes and modifications may be made in the embodiments illustrated and described herein without departing from the scope of the invention as defined by the following claims.

Having thus described the invention, what is claimed as new and desired to be secured by Letters Patent is:

1. In a steering installation for motor vehicles which are provided with a frame, at least one non-steerable ground wheel and at least one steerable ground wheel supporting said frame, an engine with controlling means therefor, transmission means from said engine to said non-steerable ground wheel, and means connecting said steerable wheel to said frame for swinging movement about a vertical axis, in combination, a rigid member disposed transversely of said frame in a position accessible to the operator's feet, means for mounting said member on said frame for limited oscillation about a horizontal axis, a foot rest at one end of said member and a treadle pivoted intermediate its ends to the opposite end of said member for movement in a vertical plane, steering connections between said member and said steerable wheel for transmitting movement to the latter when the member is oscillated about said horizontal axis, and means operatively connecting said treadle with said engine controlling means for transmitting actuating movement thereto when said treadle is rocked.

2. In a pedal operated steering installation for road vehicles which are provided with a frame, at least one non-steerable ground wheel and at least one steerable ground wheel supporting said frame, a vertical wheel post connected with said last named wheel and having bearings in said frame for horizontal pivotal movement with respect thereto, a substantially vertical steering post mounted for rotation upon said frame at a point spaced longitudinally of said frame from said wheel post, a cross-arm fixed to said wheel post and a cross-arm fixed to said steering post, links connecting ends of the respective cross-arms, a rigid member disposed transversely of said frame in a position accessible to the operator's feet, means for mounting said member on said frame for limited oscillation about a horizontal longitudinal axis, foot-rests at each end of said members, and means operatively connecting said member and said steering post for rotation of the latter when said member is oscillated by selective depression of the feet of the operator.

3. In a pedal operated steering installation for road vehicles which are provided with a frame and at least one steerable ground wheel, a vertical wheel post connected with said wheel and having bearings in said frame for horizontal pivotal movement with respect thereto, a substantially vertical steering post mounted for rotation upon said frame at a point spaced longitudinally of said frame from said wheel post, a cross-arm fixed to said wheel post and a cross-arm fixed to said steering post, the construction and arrangement being such that when the named elements are in position for straight-ahead movement of the vehicle the cross-arms are substantially parallel, crossed links connecting diagonally opposite ends of said cross-arms, a rigid member disposed transversely of said frame in a position accessible to the operator's feet, means for mounting said member on said frame at the opposite side of said steering post from the wheel post for limited oscillation about a horizontal axis, footrests at each end of said member, a bifurcated lever rigid with and extending from said steering post toward said member, a pin rigid with said member near the center thereof and received within the bifurcation of said fork, whereby when the footrest at one end of said member at one side of the vehicle is depressed the steerable wheel is swung toward the same side of the vehicle.

4. In a steering mechanism of the class described adapted for installation in vehicles of various types for controlling the steerable element thereof, a rigid supporting frame fixed to the vehicle and occupying a vertical plane extending substantially transversely of the vehicle, said frame comprising an arcuate flanged stationary guiding member, an arcuate oscillatable member mounted for relative arcuate sliding movement upon said guide member and having flanges interlocking with the flanges on said latter member, said fixed guiding member being the sole means for supporting said oscillatable member, a footrest on each end of said oscillatable member, and operative connections between said oscillatable member and the steerable element of the vehicle whereby upon depression of one of the footrests the oscillatable member will slide relatively to said supporting member and the steerable element will be moved accordingly.

5. In a steering mechanism of the class described adapted for installation in vehicles of various types for controlling the steerable element thereof, a rigid supporting frame fixed to the vehicle and occupying a vertical plane extending substantially transversely of the vehicle, said frame comprising an arcuate flanged stationary guiding member, an arcuate oscillatable member mounted for relative arcuate sliding movement upon said guide member and having flanges interlocking with the flanges on said latter member, said fixed guiding member being the sole means for supporting said oscillatable member, a footrest on each end of said oscillatable member, operative connections between said oscillatable member and the steerable element of the vehicle whereby upon depression of one of the footrests the oscillatable member will slide relatively to said supporting member and the steerable element will be moved accordingly, spring abutments on said oscillatable member and said fixed guiding and supporting member, the abutments on the respective members being spaced apart arcuately in the direction of relative oscillation, and compression springs disposed between said abutments for continually urging said oscillatable member toward a central position for straight-ahead steering.

6. In a steering mechanism of the class described adapted for installation in power vehicles of various types for controlling the steerable element and power applying controls thereof, a rigid supporting frame fixed to the vehicle and occupying a vertical plane extending substantially transversely of the vehicle, said frame comprising an arcuate flanged stationary guiding member, an arcuate oscillatable member mounted for relative arcuate sliding movement upon said guide member and having flanges interlocking with the flanges on said latter member, said fixed guiding member being the sole means for supporting said oscillatable member, a footrest on each end of said oscillatable member, operative connections between said oscillatable member and the steerable element of the vehicle whereby upon depression of one of the footrests the oscillatable member will slide relatively to said supporting member and the steerable element will be moved accordingly, the footrest upon at least one end of said oscillatable member being in the form of a depressible treadle pivoted intermediate its ends to said oscillatable member, and operative connections between said treadle and said power applying controls.

7. In a steering mechanism of the class described adapted for installation in vehicles of various types for controlling the steerable element thereof, a rigid supporting frame fixed to the vehicle and occupying a vertical plane extending substantially transversely of the vehicle, said frame comprising an arcuate flanged guiding member, an arcuate oscillatable member mounted for relative arcuate sliding movement upon said guide member and having flanges interlocking with the flanges on said latter member, a footrest on each end of said oscillatable member, operative connections between said oscillatable member and the steerable element of the vehicle whereby upon depression of one of the footrests the oscillatable member will slide relatively to said supporting member and the steerable element will be moved accordingly, said operative connections including a rotatable, substantially vertical steering post, linkages between said post and said steerable element, a bifurcated crank extending substantially horizontally from said post, a pin projecting from said oscillatable member and embraced by said bifurcated crank, to provide a pin-and-slot connection between said oscillatable member and said steering post.

8. In a steering mechanism of the class described adapted for installation in power vehicles of various types for controlling the steerable element and engine controls thereof, a rigid supporting frame fixed to the vehicle and occupying a vertical plane extending substantially transversely of the vehicle, said frame comprising an arcuate flanged guiding member, an arcuate oscillatable member mounted for relative arcuate sliding movement upon said guide member and having flanges interlocking with the flanges on said latter member, a footrest on each end of said oscillatable member, operative connections between said oscillatable member and the steerable element of the vehicle whereby upon depression of one of the footrests the oscillatable member will slide relatively to said supporting member and the steerable element will be moved accordingly, spring abutments on said oscillatable member and said guiding and supporting member, the abutments on the respective members being spaced apart in the direction of relative oscillation and springs disposed between said abutments for continually urging said oscillatable member toward a central position for straight-ahead steering, the footrest upon at least one end of said oscillatable member being in the form of a depressible treadle pivoted intermediate its ends to said oscillatable member, and operative connections between said treadle and said engine controls, said fixed named operative connections including a rotatable, substantially vertical steering post, resiliently extensible linkages between said post and said steerable element, a bifurcated crank extending substantially horizontally from said post, a pin projecting from said oscillatable member and embraced by said bifurcated crank, to provide a pin-and-slot connection between said oscillatable member and said steering post.

EDWARD LINCOLN PURKEY.

References Cited in the file of this patent

UNITED STATES PATENTS

| Number | Name | Date |
|---|---|---|
| 835,572 | Stevenson | Nov. 13, 1906 |
| 1,250,329 | Le Fever | Dec. 18, 1917 |
| 1,415,176 | Hughes | May 9, 1922 |
| 1,890,293 | Hort | Dec. 6, 1932 |
| 2,068,962 | Sanford | Jan. 26, 1937 |
| 2,209,830 | Saari | July 30, 1940 |